United States Patent
Tang et al.

(10) Patent No.: US 8,578,313 B2
(45) Date of Patent: Nov. 5, 2013

(54) PATTERN-CLIP-BASED HOTSPOT DATABASE SYSTEM FOR LAYOUT VERIFICATION

(75) Inventors: Zongwu Tang, Pleasanton, CA (US); Daniel Zhang, San Jose, CA (US); Alex Miloslavsky, Sunnyvale, CA (US); Subarnarekha Sinha, Menlo Park, CA (US); Jingyu Xu, Beijing (CN); Kent Y. Kwang, Saratoga, CA (US); Kevin A. Beaudette, Orleans, CA (US)

(73) Assignee: Synopsys, Inc., Mountain View, CA (US)

( * ) Notice: Subject to any disclaimer, the term of this patent is extended or adjusted under 35 U.S.C. 154(b) by 846 days.

(21) Appl. No.: 12/109,118

(22) Filed: Apr. 24, 2008

(65) Prior Publication Data

US 2009/0271749 A1    Oct. 29, 2009

(51) Int. Cl.
G06F 17/50    (2006.01)

(52) U.S. Cl.
USPC .......................................................... 716/112

(58) Field of Classification Search
USPC .......................................................... 716/52
See application file for complete search history.

(56) References Cited

U.S. PATENT DOCUMENTS

| | | | | |
|---|---|---|---|---|
| 7,707,542 B1 * | 4/2010 | Gennari et al. | ................. | 716/50 |
| 8,103,977 B2 * | 1/2012 | Taoka et al. | ...................... | 716/50 |
| 2003/0208741 A1 * | 11/2003 | Ono | ................................ | 716/21 |
| 2005/0134866 A1 * | 6/2005 | Kyoh et al. | .................... | 356/616 |
| 2006/0085772 A1 * | 4/2006 | Zhang | ................................ | 716/4 |
| 2006/0123380 A1 | 6/2006 | Ikeuchi | | |
| 2007/0006114 A1 * | 1/2007 | Scheffer et al. | ................. | 716/19 |
| 2007/0157153 A1 * | 7/2007 | Croffie et al. | ................... | 716/21 |
| 2007/0198958 A1 | 8/2007 | Tang | | |
| 2007/0240086 A1 | 10/2007 | Sinha | | |
| 2008/0189673 A1 * | 8/2008 | Ying | .............................. | 716/21 |

OTHER PUBLICATIONS

Yao et al., "Efficient range pattern matching algorithm for process-hotspot detection", IET Circuits, Devices & Systems, Feb. 2008, vol. 2 issue 1, pp. 2-15.*
Yao, H. et al., "Efficient range pattern matching algorithm for process-hotspot detection", Institute of Engineering and Technology 2008, IET Circuits Devices Syst., 2008, pp. 1-15.

* cited by examiner

*Primary Examiner* — Vuthe Siek
*Assistant Examiner* — Aric Lin
(74) *Attorney, Agent, or Firm* — Park, Vaughan, Fleming & Dowler LLP (57) ABSTRACT

One embodiment of the present invention provides a system that generates a pattern-clip-based hotspot database for performing automatic pattern-clip-based layout verification. During operation, the system receives a list of pattern clips which specify manufacturing hotspots to be avoided in a layout, wherein each pattern clip comprises a set of geometries in proximity to each other. Next, for each pattern clip, the system perturbs the pattern clip to determine a first range of variations for the constituent set of geometries wherein the perturbed pattern clip no longer causes a manufacturing hotspot. The system then extracts a set of correction guidance descriptions from the first range of variations for correcting the pattern clip. Subsequently, the system stores the pattern clip and the set of correction guidance descriptions in the pattern-clip-based hotspot database.

22 Claims, 8 Drawing Sheets

PATTERN-CLIP-BASED HOTSPOT DATABASE SYSTEM FOR LAYOUT VERIFICATION

BACKGROUND

1. Field of the Invention

Embodiments of the present invention generally relate to semiconductor manufacturing. More specifically, embodiments of the present invention relate to a method and a system for identifying locations in a layout of an integrated circuit (IC) chip that are susceptible to manufacturing errors.

2. Related Art

Advances in IC manufacturing technology have enabled minimum feature sizes on IC chips to continuously decrease. In fact, the current minimum feature size is smaller than the wavelengths of light used in conventional optical imaging systems. Accordingly, it is becoming increasingly difficult to achieve reasonable fidelity, which is often expressed in resolution and depth of focus, between a designed layout and the shapes of actual fabricated circuit elements. Existing reticle enhancement technologies (RETs), such as optical proximity correction (OPC), phase-shifting masks (PSMs), and sub-resolution assist features (SRAFs), are becoming inadequate to solve fabrication issues on the nanometer scale.

Manufacturability-aware physical design, which takes into account both yield and reliability during the physical-design process, is becoming increasingly important in bridging the gap between design and manufacturing for nanometer-scale fabrication processes. Many yield and reliability issues can be attributed to certain layout configurations, referred to as "process-hotspots" or "hotspots," which are susceptible to process issues, such as stress and lithographic process fluctuations. It is therefore desirable to identify and remove these process-hotspot configurations and replace them with more yield-friendly configurations.

Conventionally, layout design engineers use manufacturer-provided design rules to represent localized process-hotspots. A typical design rule checker can detect such process-hotspots within the layout, which facilitates making corrections to the process-hotspots to be compliant with the rules. However, design rules are not sufficient to detect process-hotspots caused by a set of closely arranged objects occupying a larger layout region (e.g., a 1×1 $\mu m^2$ region). Note that these "large" hotspots typically arise from a "proximity effect," which is an aggregated physical effect (that can include lithography effects and mechanical stress effects) from a particular layout configuration of a set of geometries in proximity to each other. Because of the complexity of the processes involved in the proximity effect, these proximity-effect-induced hotspots cannot effectively be described by a set of design rules.

To address this problem, a new type of hotspot-description technique referred to as "pattern clips" has been introduced by manufacturers. Note that instead of using design rules, a pattern clip provides a straightforward image-based representation of a layout configuration that can cause a process-hotspot. Note that manufacturers can routinely publish new "pattern clips" to make them available to designers to detect hotspots. Accordingly, designers can use pattern-matching techniques to identify these pattern clips in design layouts.

Unfortunately, automatic techniques for modifying a layout to resolve the identified pattern-clip-based hotspots are typically not available to the designers. Note that a pattern clip by itself is not sufficient for designers to make correction decisions for the identified hotspots. This is because each hotspot is caused by the proximity effect associated with the entire pattern clip, and the hotspot image does not indicate which of the constituent geometries need to be altered to remove or reduce the degree of the hotspot.

Hence, there is a need for a technique to automatically correct pattern-clip-based hotspots in a layout when they are identified.

SUMMARY

One embodiment of the present invention provides a system that generates a pattern-clip-based hotspot database for performing automatic pattern-clip-based layout verification. During operation, the system receives a list of pattern clips which specify manufacturing hotspots to be avoided in a layout, wherein each pattern clip comprises a set of geometries in proximity to each other. Next, for each pattern clip, the system perturbs the pattern clip to determine a first range of variations for the constituent set of geometries wherein the perturbed pattern clip no longer causes a manufacturing hotspot. The system then extracts a set of correction guidance descriptions from the first range of variations for correcting the pattern clip. Subsequently, the system stores the pattern clip and the set of correction guidance descriptions in the pattern-clip-based hotspot database.

In a variation on this embodiment, the system receives the list of pattern clips from an IC manufacturer.

In a variation on this embodiment, the system perturbs the pattern clip to determine the first range of variations by perturbing each geometry in the set of geometries to determine a range of variations for the geometry wherein the perturbed pattern clip no longer causes a manufacturing hotspot.

In a variation on this embodiment, while perturbing the pattern clip, the system determines a second range of variations for the associated set of geometries wherein the perturbed pattern clip remains a manufacturing hotspot.

In a further variation on this embodiment, the system perturbs the pattern clip to determine the second range of variations by perturbing each geometry in the set of geometries to determine a range of variations for the geometry wherein the perturbed pattern clip remains a manufacturing hotspot.

In a variation on this embodiment, the system uses the pattern-clip-based hotspot database for layout verification. Specifically, the system receives a layout for verification. Next, the system identifies one or more manufacturing hotspots within the layout by performing pattern matching for each stored pattern clip in the pattern-clip-based hotspot database. Next, for each identified hotspot, the system retrieves the set of correction guidance descriptions associated with the matched pattern clip in the pattern-clip-based hotspot database. The system then corrects the identified hotspot using the set of correction guidance descriptions.

In a further variation on this embodiment, the system identifies the manufacturing hotspots by identifying patterns that are both similar to the stored pattern clip and fall in the second range of variations associated with the stored pattern clip.

In a further variation, the system identifies the manufacturing hotspots by using a range pattern matching (RPM) technique.

In a variation on this embodiment, the system extracts the set of correction guidance descriptions from the first range of variations by: identifying multiple combinations of variations of the set of geometries from the first range of variations; computing a score for each identified combination which measures a degree of correction on the corresponding manufacturing hotspot; and combining the multiple combinations of variations and the associated scores to obtain the set of correction guidance descriptions.

In a variation on this embodiment, while perturbing the pattern clip to determine the first range of variations, the system identifies a third range of variations for the set of geometries that violate a set of predetermined design rules. The system subsequently excludes the third range of variations from the first and second ranges of variations.

In a variation on this embodiment, the system classifies the list of pattern clips into a reduced set of pattern clips using a consolidation technique prior to perturbing the pattern clip.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Overview

Figure 1:
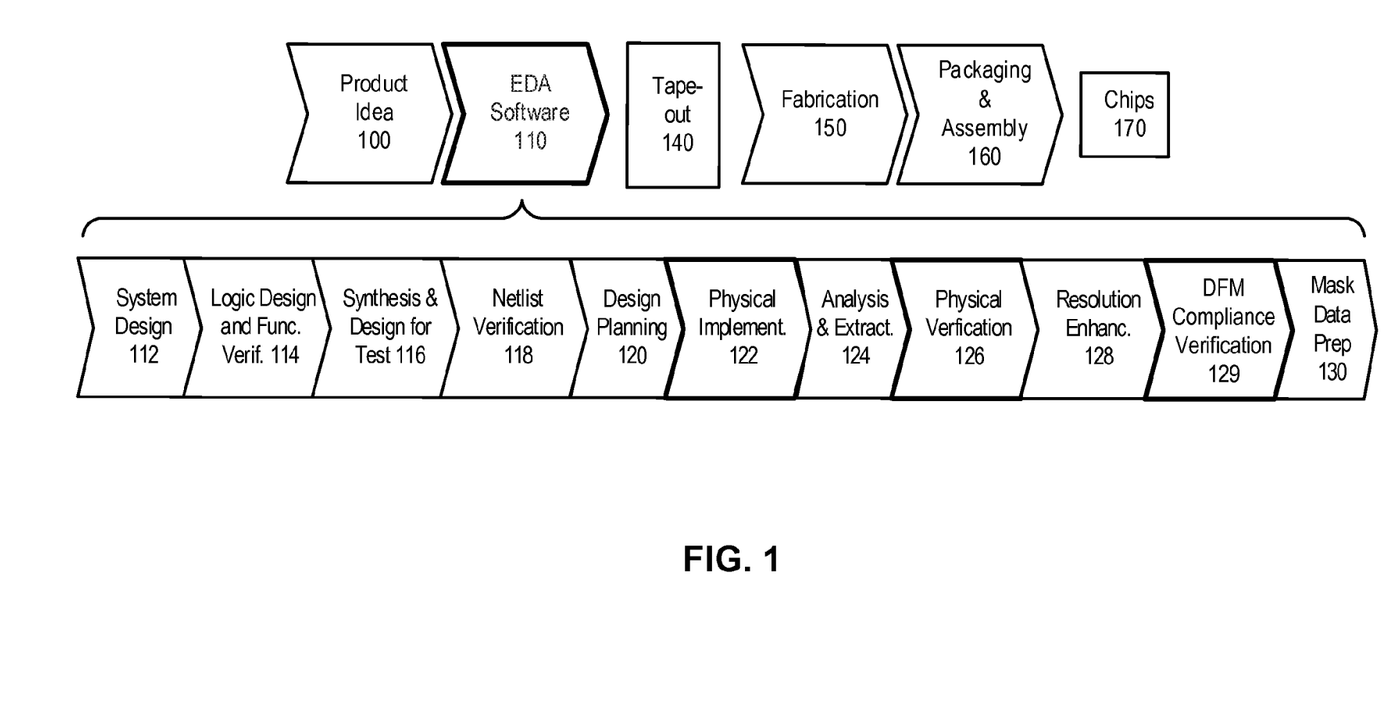
FIG. 1 illustrates various stages in the design and fabrication of an integrated circuit.

FIG. 1 illustrates various stages in the design and fabrication of an integrated circuit. The process starts with the generation of a product idea (stage 100), which is realized using an Electronic Design Automation (EDA) software design process (stage 110). When the design is finalized, it can be taped-out (stage 140). After tape-out, the fabrication process is consummated (stage 150) and packaging and assembly processes (stage 160) are performed which ultimately result in finished chips (stage 170).

The EDA software design process (stage 110), in turn, comprises stages 112-130, which are described below. Note that this design flow description is for illustration purposes only. This description is not meant to limit the present invention. For example, an actual integrated circuit design may require a designer to perform the design stages in a different sequence than the sequence described herein. The following discussion provides further details of the stages in the design process.

System design (stage 112): The designers describe the functionality to implement. They can also perform what-if planning to refine the functionality and to check costs. Hardware-software architecture partitioning can occur at this stage. Exemplary EDA software products from SYNOPSYS, INC. that can be used at this stage include MODEL ARCHITECT®, SABER®, SYSTEM STUDIO®, and DESIGNWARE® products.

Logic design and functional verification (stage 114): At this stage, the VHDL or Verilog code for modules in the system is written and the design is checked for functional accuracy. More specifically, the design is checked to ensure that it produces the correct outputs. Exemplary EDA software products from SYNOPSYS, INC. that can be used at this stage include VCS®, VERA®, DESIGNWARE®, MAGELLAN®, FORMALITY®, ESP® and LEDA® products.

Synthesis and design (stage 116): Here, the VHDL/Verilog is translated to a netlist. The netlist can be optimized for the target technology. Additionally, tests can be designed and implemented to check the finished chips. Exemplary EDA software products from SYNOPSYS, INC. that can be used at this stage include DESIGN COMPLIER®, PHYSICAL COMPILER®, TEST COMPILER®, POWER COMPILER®, FPGA COMPILER®, TETRAMAX®, and DESIGNWARE® products.

Netlist verification (stage 118): At this stage, the netlist is checked for compliance with timing constraints and for correspondence with the VHDL/Verilog source code. Exemplary EDA software products from SYNOPSYS, INC. that can be used at this stage include FORMALITY®, PRIMETIME®, and VCS® products.

Design planning (stage 120): Here, an overall floor plan for the chip is constructed and analyzed for timing and top-level routing. Exemplary EDA software products from SYNOPSYS, INC. that can be used at this stage include ASTRO® and IC COMPILER® products.

Physical implementation (stage 122): The placement (positioning of circuit elements) and routing (connection of the same) occurs at this stage. Exemplary EDA software products from SYNOPSYS, INC. that can be used at this stage include the ASTRO® and IC COMPILER® products.

Analysis and extraction (stage 124): At this stage, the circuit function is verified at a transistor level; this in turn permits what-if refinement. Exemplary EDA software products from SYNOPSYS, INC. that can be used at this stage include ASTRORAIL®, PRIMERAIL®, PRIMETIME®, and STAR RC/XT® products.

Physical verification (stage 126): In this stage, the design is checked to ensure correctness for manufacturing, electrical issues, lithographic issues, and circuitry. Exemplary EDA software products from SYNOPSYS, INC. that can be used at this stage include the HERCULES® product.

Resolution enhancement (stage 128): This stage involves geometric manipulations of the layout to improve manufacturability of the design. Exemplary EDA software products from SYNOPSYS, INC. that can be used at this stage include PROTEUS®, PROTEUS®AF, and PSMGED® products.

DFM compliance verification (stage 129): In this stage, the design (mask layout) is checked to ensure correctness for manufacturing, electrical issues, mechanical stress issues, lithographic issues, and circuitry. Exemplary EDA software products from SYNOPSYS, INC. that can be used at this stage include the PRIME YIELD®, SIVL®, SEISMOS® products.

Mask data preparation (stage 130): This stage provides the "tape-out" data for production of masks to produce finished chips. Exemplary EDA software products from SYNOPSYS, INC. that can be used at this stage include the CATS® family of products.

Embodiments of the present invention can be used during one or more of the above-described stages. Specifically, one embodiment of the present invention can be used during physical implementation stage 122, physical verification stage 126, and DFM compliance verification stage 129.

A Pattern-Clip-Based Layout Verification Environment

Figure 2:
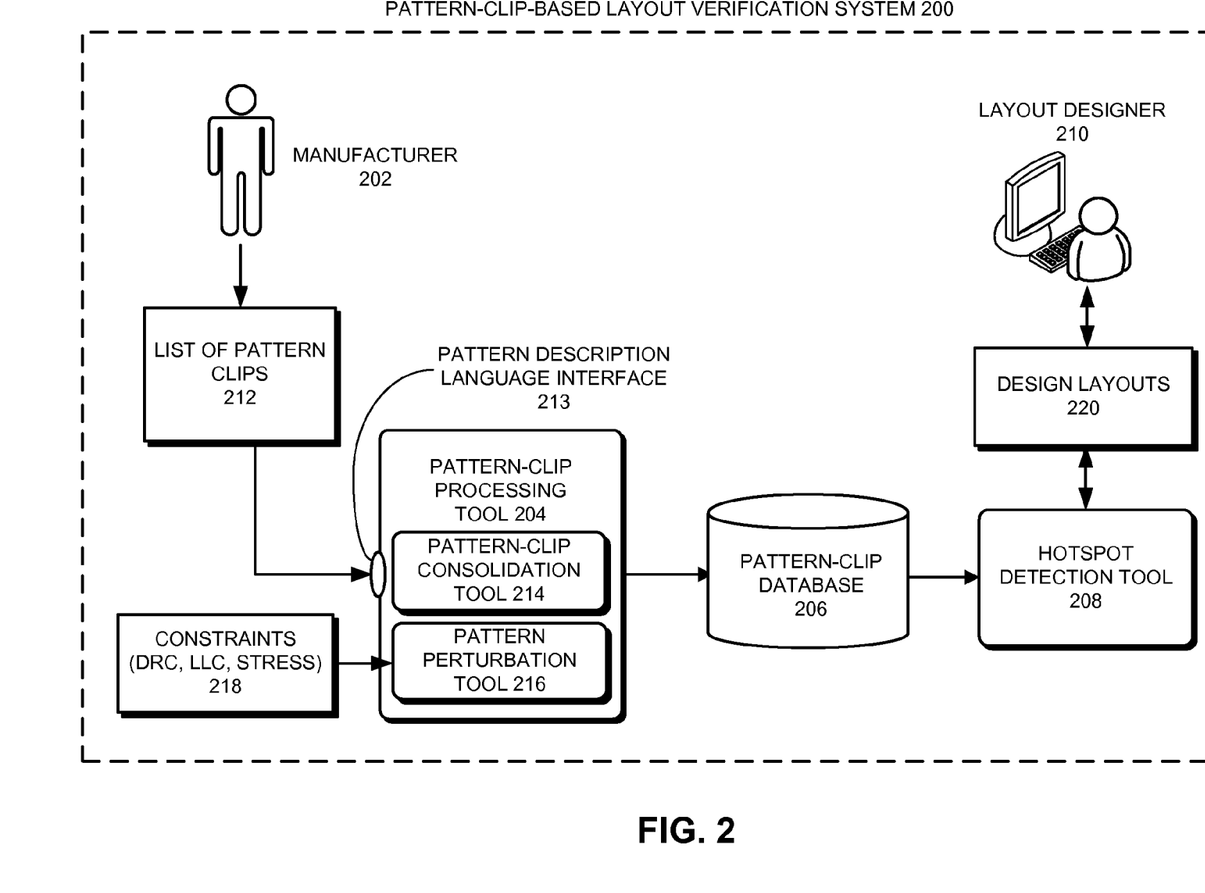
FIG. 2 presents a diagram illustrating a pattern-clip-based layout verification system in accordance with an embodiment of the present invention.

FIG. 2 presents a diagram illustrating a pattern-clip-based layout verification system 200 in accordance with an embodiment of the present invention. System 200 is associated with a manufacturer 202, a pattern-clip processing tool 204, a pattern-clip database 206, a hotspot detection tool 208 and a layout designer 210.

During operation, manufacturer 202 provides list of pattern clips 212 which specify manufacturing hotspots to be avoided in a layout. Note that manufacturer 202 can provide the list by publishing the list in a user's manual, a GUI input, or as a foundry verification tool output. Note that list of pattern clips 212 may be encrypted so that only authorized users can decrypt the pattern clips. Note also that this list of pattern clips is typically manufacturer-specific because the pattern clips are generated from the specific manufacturing tools.

Figure 3:
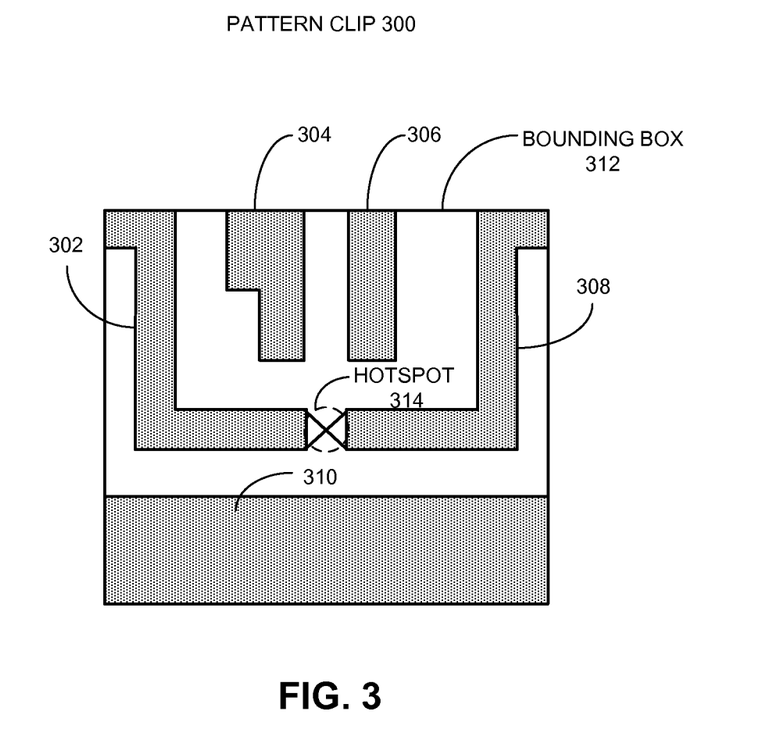
FIG. 3 illustrates an exemplary pattern clip specifying a bridging hotspot.

FIG. 3 illustrates an exemplary pattern clip 300 specifying a bridging hotspot. Note that pattern clip 300 comprises five objects 302-310 within a bounding box 312. A bridging hotspot 314 is marked within or near the gap between objects 302 and 308. Note that this bridging hotspot can cause objects 302 and 308 to connect when printed onto a wafer, thereby causing a short circuit. Also note that this bridging hotspot may not be detectable as design rule violation or another constraint violation. In contrast, bridging hotspot 314 is caused by the "proximity effect," which arises from a particular configuration of the set of geometries in the vicinity of hotspot 314. From the manufacturer's perspective, this proximity effect can be an aggregation of individual effects, such as the lithography effect and the stress effect, from each constituent geometry in the set of geometries. Hence, it is extremely difficult for the bridging hotspot in FIG. 3 is to be described by a set of design rules. Note that other pattern clips can include a larger or smaller set of geometries than pattern clip 300.

Referring back to FIG. 2, list of pattern clips 212 becomes the input to pattern-clip processing tool 204. In some embodiments, a pattern description language interface 213 at the input to pattern-clip processing tool 204 is used to convert each image-based pattern clip into a mathematical presentation that can be manipulated by pattern-clip processing tool 204.

In some embodiments of the present invention, pattern-clip processing tool 204 includes a pattern-clip consolidation tool 214 for consolidating the list of pattern clips 212 into a reduced set by using a consolidation technique. Note that the pattern-clip list from the manufacturer typically includes non-identical but similar pattern clips. In many cases, such pattern clips are associated with the same type of hotspot. Pattern-clip consolidation tool 214 is configured to identify these similar pattern clips and consolidate them into a single representative pattern clip. In some embodiments, pattern-clip consolidation tool 214 also classifies the list of pattern clips 212 into a set of categories. We describe the operation of pattern-clip consolidation tool 214 in more detail below in conjunction with FIG. 4.

Pattern-clip processing tool 204 further includes a pattern perturbation tool 216 for generating "correction guidance descriptions" for the list of pattern clips, wherein the correction guidance descriptions include one or more correction recommendations that can be used to correct a respective pattern clip to remove the associated hotspot or to reduce the hotspot severity. Pattern-clip processing tool 204 can additionally create a data structure "patternClip," wherein each instance of patternClip includes a distinctive pattern clip and the corresponding correction guidance descriptions generated by pattern perturbation tool 216.

More specifically, pattern perturbation tool 216 is configured to perturb a constituent set of geometries within an input pattern clip to determine a first range of variations for the set of geometries wherein the perturbed pattern clip no longer causes a manufacturing hotspot. In some embodiments, pattern perturbation tool 216 additionally determines a second range of variations for the set of geometries wherein the perturbed pattern clip remains a valid hotspot. Pattern perturbation tool 216 then generates the correction recommendations from the first range of variations, which can be used to correct the corresponding hotspot. We describe pattern perturbation tool 216 in more detail below in conjunction with FIG. 4 and FIG. 6. Note that pattern perturbation tool 216 also receives a set of constraints 218, which can include design constraints which are not to be violated during the pattern perturbation process.

Pattern-clip processing tool 204 outputs pattern clips along with corresponding correction guidance descriptions, and stores them into a pattern-clip database 206. Note that when a client queries a stored pattern clip, pattern-clip database 206 can return both the requested pattern clip and the associated correction guidance descriptions.

Pattern-clip database 206 is coupled to a client-side hotspot detection tool 208, which is configured to perform layout verification on an input layout. More specifically, hotspot detection tool 208 can detect pattern-clip-based hotspots within the given layout. As illustrated in FIG. 2, hotspot detection tool 208 receives design layouts 220 from layout designer 210. During a verification operation, hotspot detection tool 208 can access pattern-clip database 206 to retrieve pattern clips and the associated correction guidance descriptions stored in database 206. Hotspot detection tool 208 then scans the input layout to find matches for each of the pattern clips in database 206 using a pattern-matching or pattern-recognition technique. Each match in a target layout constitutes a layout hotspot. When a hotspot is detected, hotspot detection tool 208 can mark the design features as a violation in the layout. In some embodiments of the present invention, once a hotspot is identified, hotspot detection tool 208 can retrieve correction guidance descriptions associated with the matched pattern clip, and can perform a runtime or offline correction process to remove the hotspot in the layout, or reduce the hotspot severity. We describe the operation of hotspot detection tool 208 in more detail in conjunction with FIG. 6 below. Note that hotspot detection tool 208 can return pattern-clip-hotspot-clean versions of design layouts 220 to layout designer 210.

Process of Processing the Received Pattern Clips

Figure 4:
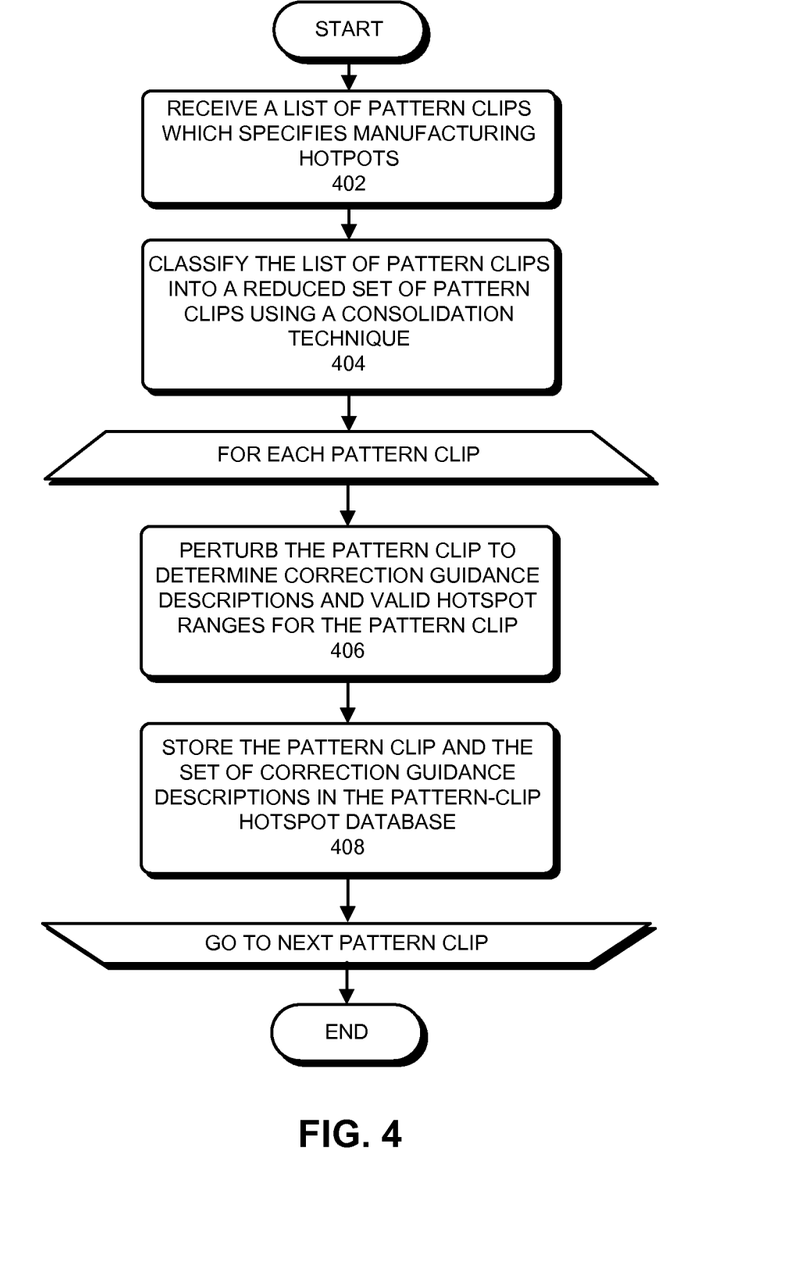
FIG. 4 presents a flowchart illustrating the processing of manufacturer-provided pattern clips to generate the correction guidance descriptions in accordance with an embodiment of the present invention.

FIG. 4 presents a flowchart illustrating the processing of manufacturer-provided pattern clips to generate the correction guidance descriptions in accordance with an embodiment of the present invention.

During operation, the system receives a list of raw pattern clips from a manufacturer, wherein each pattern clip specifies a manufacturing hotspot to be avoided in a layout (step 402). Each pattern clip includes a set of two-dimensional (2D) geometries contained within a bounding box. In some embodiments, the pattern clips (i.e., the associated bounding boxes) can have sizes of about 1×1 $\mu m^2$. However, they can also have sizes greater or less than 1×1 $\mu m^2$. In one embodiment, pattern clips have dimensions at least 2~3 pitches wide in each direction.

Upon receiving the set of pattern clips, the system classifies the list of pattern clips into a reduced set of pattern clips by consolidating the set of pattern clips (step 404). Note that when a manufacturer publishes new pattern clips, they are typically "raw" pattern clips which are not consolidated or classified into a set of categories. In other words, multiple raw pattern clips may have similar or substantially identical configurations while causing the same type of hotspot. In some embodiments, multiple similar raw pattern clips can be consolidated into a single pattern clip by extracting the common features from them, and then the processed raw pattern clips can be removed from the list.

Note that the consolidated pattern clip can be used to identify any of the removed raw pattern clips in a pattern layout using a suitable pattern-matching technique. Hence, using a consolidated pattern clip to represent multiple similar raw pattern clips can save storage space and computational resources because only a reduced set of pattern clips are stored and used during the subsequent layout verification processes.

Figure 5:
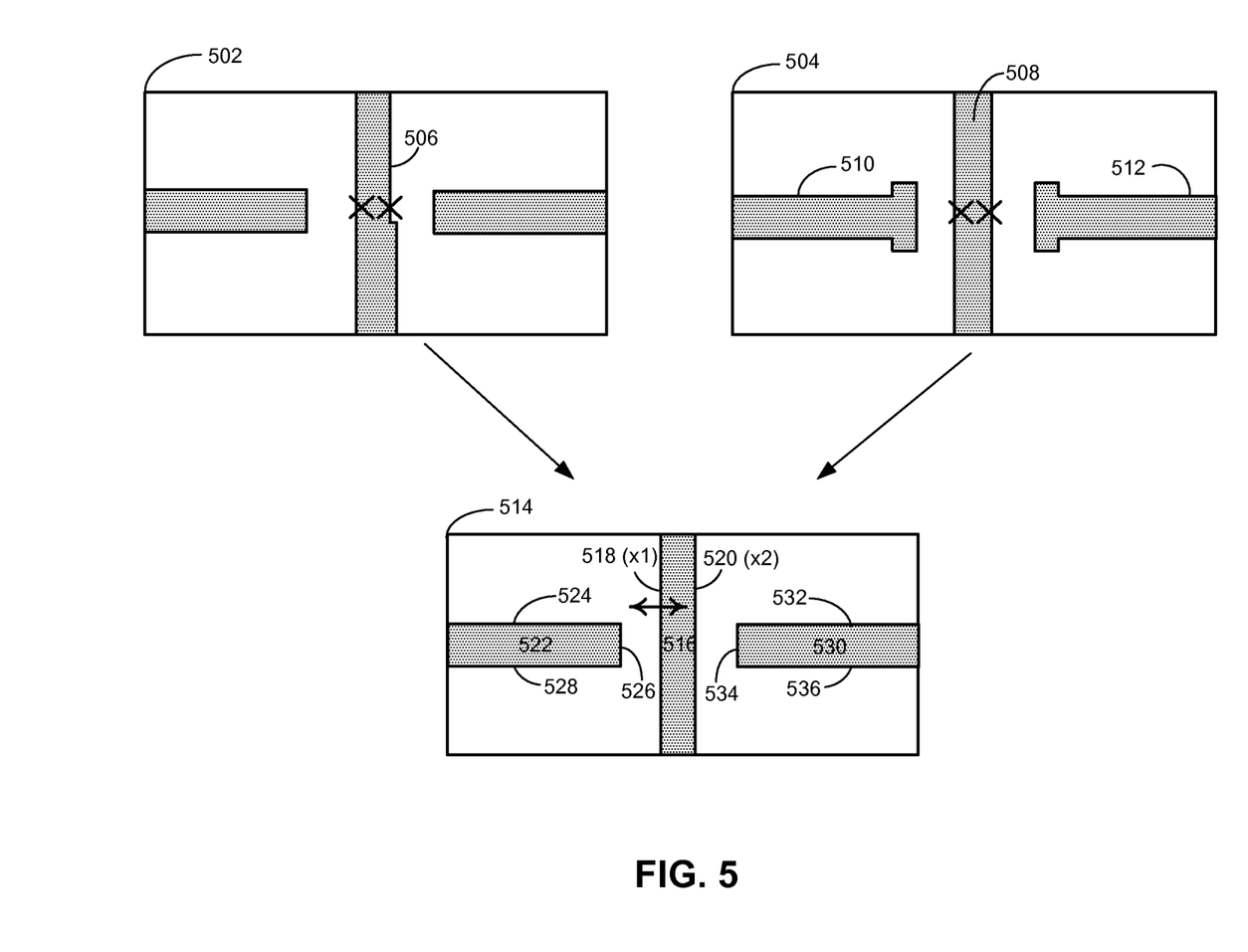
FIG. 5 illustrates the process of consolidating of an exemplary pair of raw pattern clips.

For example, FIG. 5 illustrates the process of consolidating an exemplary pair of raw pattern clips 502 and 504. Note that both pattern clips include three similar geometries that are similarly configured. More specifically, this configuration creates a proximity effect which can cause a "pinching" hotspot at locations marked with "X" on the respective vertical line segments 506 and 508. Note that the differences between the raw pattern clips 502 and 504 (such as the widened line ends on geometries 510 and 512) are relatively small in comparison to the overall size of the pattern clip. Hence, these two pattern clips can be consolidated into a single pattern clip 514, which can be classified as a pinching hotspot. Raw pattern clips 502 and 504 can then be discarded. Note that pattern clip 514 retains those common features in pattern clips 502 and 504 while removing some of the differences between pattern clips 502 and 504. Note also that pattern clip 514 can be used to identify patterns similar to both raw pattern clips 502 and 504 from a layout by using a pattern-matching technique.

Returning to FIG. 4, in some embodiments of the present invention, however, step 404 is optional, so that the set of input pattern clips may not be consolidated.

After consolidating and classifying the list of raw pattern clips, the system performs a perturbation operation on each of the pattern clips to determine correction guidance descriptions for each of the pattern clips (step 406). In some embodiments of the present invention, this perturbation operation additionally determines ranges of variations for each of the pattern clips wherein the pattern clip remains a valid hotspot. We describe the perturbation operation 406 in more detail below in conjunction with FIG. 6.

After generating the correction guidance descriptions and optionally generating the valid hotspot ranges for the set of pattern clips, the system stores the pattern clip and the set of correction guidance descriptions in the pattern-clip hotspot database (step 408). In some embodiments, the system stores each pattern clip and the associated correction guidance descriptions as an entry in the database in a patternClip data structure.

Note that pattern-clip hotspot database can continue to grow by receiving new pattern-clip-based hotspots and the associated correction guidance descriptions. Once established, the stored pattern clips and the associated correction guidance descriptions can be quickly queried and retrieved for layout verification and other purposes.

Process of Perturbing a Pattern Clip

Figure 6:
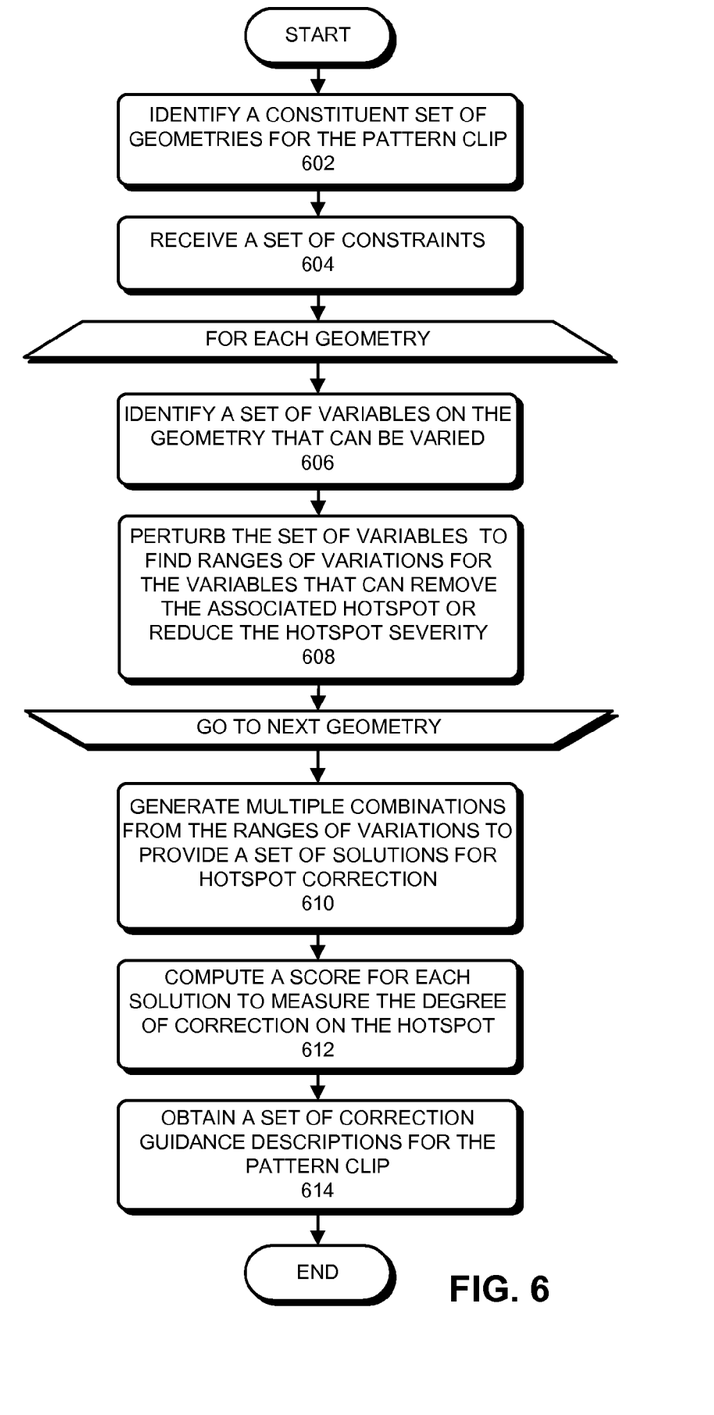
FIG. 6 presents a flowchart illustrating the process of perturbing a pattern clip to determine the correction guidance descriptions in accordance with an embodiment of the present invention.

FIG. 6 presents a flowchart illustrating the process of perturbing a pattern clip to determine the correction guidance descriptions in accordance with an embodiment of the present invention.

During operation, the system identifies a constituent set of geometries within the pattern clip (step 602). In some embodiments, this constituent set of geometries is the entire set of geometries within the pattern-clip bounding box. In other embodiments, the constituent set of geometries includes the geometries located in the immediate vicinity of the hotspot, which can be a subset of geometries within the bounding box. For example in FIG. 3, the constituent set of geometries includes all five objects 302 to 310 within the pattern clip 300.

The system additionally receives a set of design constraints (step 604). In some embodiments, this set of constraints includes design rule checking constraints (DRC), lithographical compliance check constraints (LCC), stress constraints, timing constraints, and other design constraints. Note that these constraints are checked during the perturbation process to ensure design integrity is not compromised. More specifically, these constraints are checked while the set of geometries is perturbed. If a range of variation is found to violate one of these constraints, this range is excluded from being considered for purposes of hotspot correction guidance, or as a valid hotspot range.

Next, for each of the constituent sets of geometries, the system identifies a set of variables that can be varied for the geometry (step 606). More specifically, the system first identifies a set of edges and/or sections of polygons that form the geometry, and determines from these edges and segments those that are movable from their original positions. For example, middle rectangle 516 in FIG. 5 has two movable edges 518 and 520. Rectangle 522 has three movable edges 524, 526, and 528. Similarly, rectangle 530 has movable edges 532, 534, and 536. Each of the movable edges can be represented by a variable, for example, $x_1$ for edge 518, and $x_2$ for edge 520. More specifically, each of the variables represents a distance moved from the original position of the pattern clip. Hence, they have "zero" values at their original positions. Note that the direction of movement for each movable edge is typically perpendicular to that edge. For example, by moving edge 518 on object 516 in the direction of the arrow, the gap between objects 516 and 522 can be increased or decreased. In the following discussion, we use the convention that movement to the left or downwards is represented by negative values in the associated variables, while movements to the right or upwards is represented by positive values in the associated variable.

In some embodiments, the system can use a "pattern description language" to automatically describe the set of geometries within a pattern clip. More specifically, the pattern description language provides a mathematical representation for the set of geometries (e.g., the width and location of the edges) and the relative positions between the set of geometries. Moreover, the system can use a "range description language" to automatically describe the ranges of variations for the set of geometries. Note that the range description language can provide a mathematical representation for the variations of the set of geometries (i.e., ranges of variations for the movable edges). More details of a range description language are provided in U.S. patent application Ser. No. 11/394,466, entitled "A Range Pattern Definition of Susceptibility of Layout Regions to Fabrication Issues," by inventors Subarnarekha Sinha, and Charles C. Chiang, filed 31 Mar. 2006, which is hereby incorporated by reference. Note that the pattern description language and the range description language collectively provide a technique for performing the perturbation operation.

Returning to FIG. 6, the system next perturbs the set of variables for the constituent set of geometries to determine a first range of variations for the variables that can remove the associated hotspot or reduce the hotspot severity (step 608). More specifically, the system varies each identified variable of a given geometry in a different range around the original value of the variable. Note that any variation to the set of geometries results in a modified pattern clip. For each range of variation, the system tests to determine if the modified pattern clip no longer causes a hotspot. In some embodiments, the system can apply a lithography model to the modified pattern clip for the printability test. While varying the variables, the system can also test the range of variations against the constraints. For example, to test stress constraints, the system can apply a stress model to the modified pattern clip and compute the stress at some predetermined locations, such as corners or bends in geometries. Those ranges of variations which violate the constraints are excluded from the first range of variations. Note that a hotspot can be removed or reduced by: varying a single variable within a single geometry, varying multiple variables within a single geometry, varying a single variable within each of multiple geometries, or varying multiple variables within each of multiple geometries.

In some embodiments, while perturbing the identified variables in the set of geometries, the system additionally determines a second range of variations for the variables such that the perturbed pattern clip remains a hotspot. In some embodiments, the system can use a range pattern matching (RPM) technique to find the ranges of valid hotspots. A detailed description of the RPM technique is provided in U.S. patent application Ser. No. 11/786,683, entitled "Range Pattern Matching for Hotspots Containing Vias and Incompletely Specified Range Patterns," by inventors Jingyu Xu, Subarnarekha Sinha, and Charles C. Chiang, filed 11 Apr. 2007, which is hereby incorporated by reference. Note that the first range of variations for hotspot correction and the second range of variations for valid hotspots are mutually exclusive.

The system next generates multiple combinations from the first range of variations, wherein each combination provides a unique solution for hotspot correction (step 610). Note that these combinations can include: a range of a single variable on a single geometry, ranges of multiple variables on a single geometry, or ranges of multiple variables on multiple geometries. Note that each of these combinations, when applied to the original pattern clip, can correct the hotspot to a different degree. For example, some can result in a complete removal of the hotspot, while others only reduce the hotspot severity. The system then computes a score for each combination to measure the degree of correction on the hotspot (step 612). In some embodiments, the system uses a set of predetermined criteria to compute the scores.

Finally, the system combines the multiple combinations of variations and the associated scores to obtain the set of correction guidance descriptions for the pattern clip (step 614). The set of correction guidance descriptions is then stored along with the pattern clip into the database.

Figure 7:
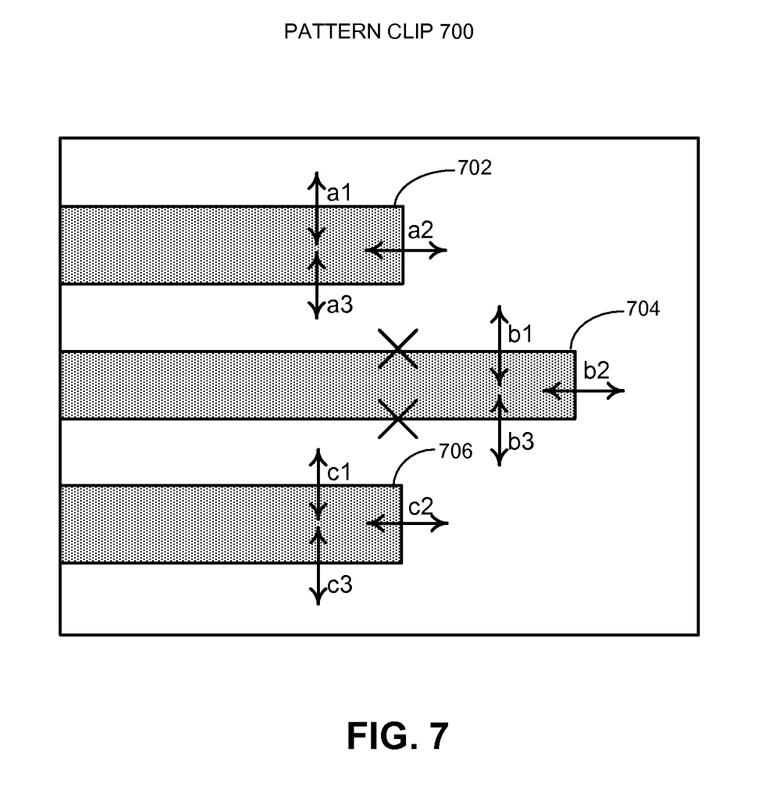
FIG. 7 illustrates an exemplary process of perturbing a pattern clip to determine a set of correction guidance descriptions in accordance with an embodiment of the present invention.

FIG. 7 illustrates an exemplary process of perturbing a pattern clip 700 to determine a set of correction guidance descriptions in accordance with an embodiment of the present invention. Note that pattern clip 700 is clear of DRC errors.

More specifically, pattern clip 700 comprises three adjacent horizontal line objects 702, 704, and 706, wherein the middle line object 704 extends farther to the right than the top and bottom line objects 702 and 706. Note that the geometry of each line object can be represented by three edge: edges $a_1$ (top), $a_2$ (end), and $a_3$ (bottom) for object 702; edges $b_1$ (top), $b_2$ (end), and $b_3$ (bottom) for object 704; and edges $c_1$ (top), $c_2$ (end), and $c_3$ (bottom) for object 706. The configuration of the three line objects creates a proximity effect that can cause a lithography hotspot at the locations marked "X" on line object 704. More specifically, this is a "pinching" hotspot that can cause line object 704 to disconnect, thereby causing an open circuit when printed onto a wafer.

During operation, the system attempts to perturb the set of variables associated with the set of edges: $a_1, a_2, a_3, b_1, b_2, b_3, c_1, c_2$ and $c_3$. Note that the arrow shown next to each variable in FIG. 7 represents the direction of movement for the variable during perturbation. For example, edge $a_1$ can be moved up or down, while edge $b_2$ can be moved to the left or right. However, the system determines that moving $a_1, a_3, b_1, b_3, c_1$, and $c_3$ will violate DRC constraints. Thus, only $a_2, b_2$, and $c_2$ remain to be perturbed. The system also determines that moving $b_2$ has no effect on correcting the hotspot. Hence, only $a_2$ and $c_2$ remain to be varied.

While perturbing $a_2$ and $c_2$, the system determines that in the range of [−20 nm, 20 nm] for both variables, the hotspot remains valid. Hence, these ranges of variations can be used to identify similar hotspots in a layout. Next, the system determines that either extending $a_2$ or $c_2$ beyond 40 nm (to the right) violates DRC constraints. On the other hand, when $a_2$ and $c_2$ are varied within a range of [20 nm, 40 nm], the hotspot can be corrected. For example, by choosing $a_2$=21 nm and/or $c_2$=21 nm, the hotspot can be corrected. The system subsequently identifies different combinations of these changes, and computes scores for changing only $a_2$, changing only $c_2$, or changing both $a_2$ and $c_2$. Note that in this example, it can be determined that changing $a_2$ and $c_2$ separately results in the same hotspot correction score, which is lower than changing both variables concurrently. The system next combines the correction scores with the corresponding variations to form a set of correction guidance descriptions: (1) $a_2$=21 nm (no change to other variables); (2) $c_2$=21 nm (no change to other variables); and (3) $a_2$=21 nm and $c_2$=21 nm (no change to other variables).

Note that the above-described process is for illustrating the perturbation process to identify correction guidance descriptions and valid hotspot ranges, but not intended to limit how the perturbation process can be performed.

Process of Pattern-Clip-Based Layout Verification

Figure 8:
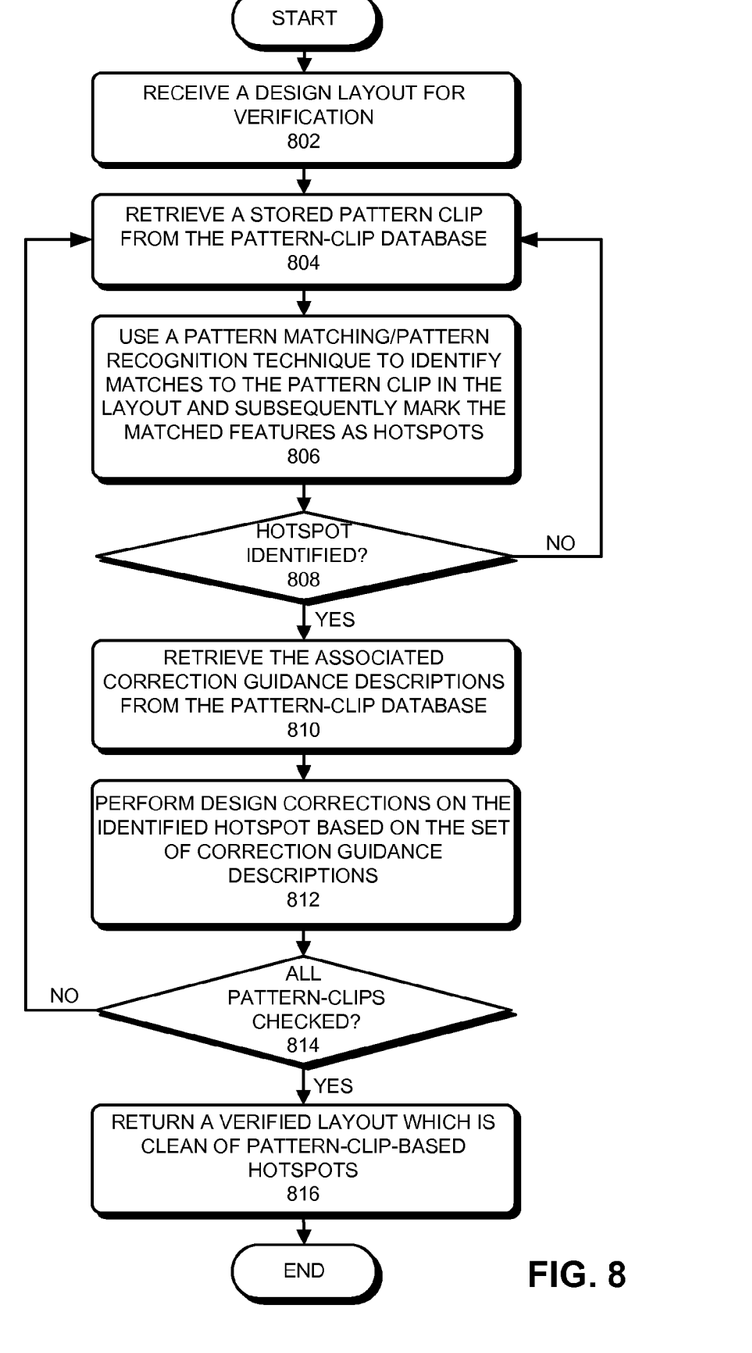
FIG. 8 presents a flowchart illustrating the process of performing pattern-clip-based layout verification in accordance with an embodiment of the present invention.

FIG. 8 presents a flowchart illustrating the process of performing pattern-clip-based layout verification in accordance with an embodiment of the present invention.

During operation, the system receives a design layout for verification (step 802). Next, the system retrieves a stored image-based pattern clip from the pattern-clip hotspot database (step 804). The system then uses a pattern-matching/ pattern-recognition technique to identify matches to the pattern clip in the given design layout and to mark the matched features as hotspots (step 806).

In some embodiments, the system uses a range pattern matching (RPM) technique to identify matches to the pattern clip in the given layout. Note that conventional techniques are based on exact pattern representation. However, the actual pattern configurations often vary between layouts or between different regions of a layout. To capture such variations, the system is often required to store a large number of similar, exact pattern representations. The RPM technique pattern can efficiently represent a group of similar patterns by defining ranges of geometric parameters of a hotspot pattern, such as length, width, and spacing. Hence, by performing range pattern matching instead of exact pattern matching, the system can significantly improve hotspot-detection performance while reducing the burden on computational resources.

Next, the system determines if one or more hotspots have been detected in the layout (step 808). If not, the system returns to step 804 to retrieve the next stored pattern clip from the database.

Otherwise, for each identified hotspot, the system retrieves the set of correction guidance descriptions associated with the pattern clip from the pattern-clip hotspot database (step 810). Note that the set of correction guidance descriptions may be represented in a pattern description language and/or a range description language. The system subsequently performs design corrections on the identified hotspot which are based on the set of correction guidance descriptions (step 812).

At this point, the system determines if all the pattern clips in the database have been checked by the layout (step 814). If not, the system returns to step 804 to retrieve the next stored pattern clip in the database to repeat steps 806 to 814. Finally, when all the stored pattern-clips have been processed, the system returns to layout designer a verified layout which is clean of pattern-clip-based hotspots (step 816). Note that the above-described layout verification process can be performed in a fully automatic manner (through conventional database operations) without having designer manually supplying pattern-clips and the associated correction guidance descriptions.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for generating a pattern-clip-based hotspot database for performing automatic pattern-clip-based layout verification, the method comprising:
    receiving a list of pattern clips which specify manufacturing hotspots to be avoided in a layout, wherein each pattern clip comprises a set of geometries in proximity to each other;
    consolidating the list of pattern clips into a reduced set of pattern clips, which involves merging a first pattern clip and a second pattern clip in the list of pattern clips into a third pattern clip by retaining only common features between the first and second pattern clips;
    for each pattern clip in the reduced set of pattern clips,
        perturbing the pattern clip to determine a first range of variations for the set of geometries wherein the perturbed pattern clip no longer causes a manufacturing hotspot;
        extracting, by computer, a set of correction guidance descriptions from the first range of variations for correcting the pattern clip; and
        storing the pattern clip and the set of correction guidance descriptions in the pattern-clip-based hotspot database.

2. The method of claim 1, wherein receiving the list of pattern clips involves receiving the list of pattern clips from an IC manufacturer.

3. The method of claim 1, wherein perturbing the pattern clip to determine the first range of variations involves perturbing each geometry in the set of geometries to determine a range of variations for the geometry wherein the perturbed pattern clip no longer causes a manufacturing hotspot.

4. The method of claim 1, wherein while perturbing the pattern clip, the method further comprises determining a second range of variations for the associated set of geometries wherein the perturbed pattern clip remains a manufacturing hotspot.

5. The method of claim 4, wherein perturbing the pattern clip to determine the second range of variations involves perturbing each geometry in the set of geometries to determine a range of variations for the geometry wherein the perturbed pattern clip remains a manufacturing hotspot.

6. The method of claim 4, wherein the method further comprises:
    receiving a layout for verification;
    identifying one or more manufacturing hotspots within the layout using the pattern-clip-based hotspot database by performing pattern matching for each stored pattern clip in the pattern-clip-based hotspot database;
    for each identified hotspot, retrieving the set of correction guidance descriptions associated with the matched pattern clip in the pattern-clip-based hotspot database; and
    correcting the identified hotspot using the set of correction guidance descriptions.

7. The method of claim 6, wherein identifying the manufacturing hotspots involves identifying patterns that are both similar to the stored pattern clip and fall in the second range of variations associated with the stored pattern clip.

8. The method of claim 6, wherein identifying the manufacturing hotspots involves using a range pattern matching (RPM) technique.

9. The method of claim 1, wherein extracting the set of correction guidance descriptions from the first range of variations involves:
    identifying multiple combinations of variations of the set of geometries from the first range of variations;
    computing a score for each identified combination which measures a degree of correction on the corresponding manufacturing hotspot; and
    combining the multiple combinations of variations and the associated scores to obtain the set of correction guidance descriptions.

10. The method of claim 1, wherein while perturbing the pattern clip to determine the first range of variations, the method further comprises:
    identifying a third range of variations for the set of geometries that violate a set of predetermined design rules; and
    excluding the third range of variations from the first and second ranges of variations.

11. A non-transitory computer-readable storage medium storing instructions that when executed by a computer cause the computer to perform a method for generating a pattern-clip-based hotspot database for performing automatic pattern-clip-based layout verification, the method comprising:

receiving a list of pattern clips which specify manufacturing hotspots to be avoided in a layout, wherein each pattern clip comprises a set of geometries in proximity to each other;

consolidating the list of pattern clips into a reduced set of pattern clips, which involves merging a first pattern clip and a second pattern clip in the list of pattern clips into a third pattern clip by retaining only common features between the first and second pattern clips;

for each pattern clip in the reduced set of pattern clips,
perturbing the pattern clip to determine a first range of variations for the set of geometries wherein the perturbed pattern clip no longer causes a manufacturing hotspot;

extracting a set of correction guidance descriptions from the first range of variations for correcting the pattern clip; and storing the pattern clip and the set of correction guidance descriptions in the pattern-clip-based hotspot database.

12. The non-transitory computer-readable storage medium of claim 11, wherein receiving the list of pattern clips involves receiving the list of pattern clips from an IC manufacturer.

13. The non-transitory computer-readable storage medium of claim 11, wherein perturbing the pattern clip to determine the first range of variations involves perturbing each geometry in the set of geometries to determine a range of variations for the geometry wherein the perturbed pattern clip no longer causes a manufacturing hotspot.

14. The non-transitory computer-readable storage medium of claim 11, wherein while perturbing the pattern clip, the method further comprises determining a second range of variations for the associated set of geometries wherein the perturbed pattern clip remains a manufacturing hotspot.

15. The non-transitory computer-readable storage medium of claim 14, wherein perturbing the pattern clip to determine the second range of variations involves perturbing each geometry in the set of geometries to determine a range of variations for the geometry wherein the perturbed pattern clip remains a manufacturing hotspot.

16. The non-transitory computer-readable storage medium of claim 14, wherein the method further comprises:
receiving a layout for verification;
identifying one or more manufacturing hotspots within the layout using the pattern-clip-based hotspot database by performing pattern matching for each stored pattern clip in the pattern-clip-based hotspot database;
for each identified hotspot, retrieving the set of correction guidance descriptions associated with the matched pattern clip in the pattern-clip-based hotspot database; and
correcting the identified hotspot using the set of correction guidance descriptions.

17. The non-transitory computer-readable storage medium of claim 16, wherein identifying the manufacturing hotspots involves identifying patterns that are both similar to the stored pattern clip and fall in the second range of variations associated with the stored pattern clip.

18. The non-transitory computer-readable storage medium of claim 16, wherein identifying the manufacturing hotspots involves using a range pattern matching (RPM) technique.

19. The non-transitory computer-readable storage medium of claim 11, wherein extracting the set of correction guidance descriptions from the first range of variations involves:
identifying multiple combinations of variations of the set of geometries from the first range of variations;
computing a score for each identified combination which measures a degree of correction on the corresponding manufacturing hotspot; and
combining the multiple combinations of variations and the associated scores to obtain the set of correction guidance descriptions.

20. The non-transitory computer-readable storage medium of claim 11, wherein while perturbing the pattern clip to determine the first range of variations, the method further comprises:
identifying a third range of variations for the set of geometries that violate a set of predetermined design rules; and
excluding the third range of variations from the first and second ranges of variations.

21. A system that generates a pattern-clip-based hotspot database for performing automatic pattern-clip-based layout verification, comprising:
a receiving mechanism configured to receive a list of pattern clips which specify manufacturing hotspots to be avoided in a layout, wherein each pattern clip comprises a set of geometries in proximity to each other;
a consolidating mechanism configured to consolidate the list of pattern clips into a reduced set of pattern clips, which involves merging a first pattern clip and a second pattern clip in the list of pattern clips into a third pattern clip by retaining only common features between the first and second pattern clips;
a perturbation mechanism configured to perturb a pattern clip in the reduced set of pattern clips to determine a first range of variations for the set of geometries wherein the perturbed pattern clip no longer causes a manufacturing hotspot;
an extraction mechanism configured to extract a set of correction guidance descriptions from the first range of variations for correcting the pattern clip; and
a storage mechanism configured to store the pattern clip and the set of correction guidance descriptions in the pattern-clip-based hotspot database.

22. The system of claim 21, further comprising:
a receiving mechanism configured to receive a layout for verification;
an identification mechanism configured to identify one or more manufacturing hotspots within the layout using the pattern-clip-based hotspot database by performing pattern matching for each stored pattern clip in the pattern-clip-based hotspot database;
a retrieval mechanism configured to retrieve the set of correction guidance descriptions associated with the matched pattern clip in the pattern-clip-based hotspot database; and
a correction mechanism configured to correct the identified hotspot using the set of correction guidance descriptions.

\* \* \* \* \*